Dec. 28, 1965 R. J. GRAMBSCH 3,226,489

COMMUNICATIONS CONTROL SYSTEM

Filed Oct. 24, 1962 2 Sheets-Sheet 1

INVENTOR.
Russel Grambsch

BY Moore, Hall & Pollock

ATTORNEYS

Dec. 28, 1965 R. J. GRAMBSCH 3,226,489

COMMUNICATIONS CONTROL SYSTEM

Filed Oct. 24, 1962 2 Sheets-Sheet 2

INVENTOR.
Russel Grambsch

BY Moore, Hall & Pollock

ATTORNEYS

United States Patent Office 3,226,489
Patented Dec. 28, 1965

3,226,489
COMMUNICATIONS CONTROL SYSTEM

Russel J. Grambsch, Mosinee, Wis.
(7238 Barrett Road, West Chester, Ohio)

Filed Oct. 24, 1962, Ser. No. 232,725
7 Claims. (Cl. 179—39)

The present invention relates to an improved control system adapted to be used in conjunction with pre-existing communication equipment, e.g., telephone equipment, and arranged to supply control information of a desired type when a path of communication is being established; and is more particularly concerned with an improved automatic apparatus adapted to be employed in conjunction with a telephone receiver for temporarily preventing completion of a call or transmission of a ringing signal to said receiver, and for advising a calling party, during said temporary prevention period, that the receiving party prefers that the call not be completed.

In various communication systems operating over long lines or via transmitted radio frequencies, circumstances often arise when, for one reason or another, a receiving party would prefer that the transmission not be completed. While the system of the present invention finds utility in any prior communication system of these general types, the reasons underlying the new device here involved become more readily apparent when considered in conjunction with pre-existing telephone systems; and accordingly, the subsequent description will concern itself with such telephone systems, it being understood, however, that it is not limited thereto.

As is well known to persons having telephones, circumstances may arise where one having a telephone would prefer that the phone not ring. For example, if some one is sleeping, the ringing of a telephone might represent an unwanted disturbance. In the past, this problem has been met, if at all, by the use of a switching mechanism in the ringing circuit of the telephone so arranged that said ringing circuit may be temporarily disconnected. This has been effective to avoid disturbances of the type mentioned; but has been subject to the serious disadvantage that it, in effect, prevents the completion of all telephone calls, even those which may be highly important or of an emergency character.

The present invention, recognizing this problem, accordingly effects a solution thereto which departs from the prior systems, discussed above. In accordance with the present invention, a control system is provided which detects efforts to complete a call, and which temporarily prevents such completion for a period of time, during which the calling party is automatically advised that a receiving party would prefer that the call not be completed. If the calling party, so advised, nevertheless believes that the call is of such importance that the receiving party would actually prefer to receive it, the calling party can, by persisting in his effort to complete the call, effectively over-ride the control device and thereby cause the receiving telephone to ring. The automatic control system of the present invention thus has the advantages of prior systems in that ringing of the receiving telephone is avoided when the receiving party would prefer not to be disturbed; and simultaneously avoids the disadvantages of prior systems in that important calls may nevertheless be completed at the option of the calling party.

It is accordingly an object of the present invention to provide a control system adapted to be used in conjunction with pre-existing communication equipment, and arranged to temporarily delay the completion of a communication path.

Another object of the present invention resides in the provision of an improved telephone attachment arranged to advise a calling party that a receiving party would prefer not to be disturbed; and adapted to be selectively overridden at the option of the calling party when circumstances warrant such disturbance.

A still further object of the present invention resides in the provision of a control apparatus adapted to intercept alerting signals, such as a telephone ringing signal, and adapted to respond to such intercepted signals to advise a calling party that said alerting signal has been temporarily intercepted.

A further object of the present invention resides in the provision of an improved telephone system so arranged that efforts to place telephone calls will be delayed for a temporary period of time sufficient to advise a calling party that a receiving party would prefer that the call not be completed.

A still further object of the present invention resides in the provision of an improved control apparatus adapted to be used in conjunction with pre-existing communication equipment, and with telephone equipment of either the private or party line types, for performing informational control functions in response to attempted efforts to complete a telephone call.

In providing for the foregoing objects and advantages, the present invention contemplates the provision of an improved control unit adapted to be coupled to pre-existing communication equipment, e.g., to telephone lines adjacent a receiver, and arranged to respond to ringing or other alerting signals in a novel manner. The control unit itself is so arranged that it may be selectively enabled or disabled at the option of a receiving party; and it is further so arranged that, once it has completed an entire cycle of operation, without a call having been completed, it automatically readies itself for a similar such subsequent control operation. The control system itself comprises a switching apparatus responsive to ringing signals produced when efforts are first made to complete a call, and operative to divert such ringing signals away from the receiver, thereby to prevent an undesired disturbance at a receiving location. The ringing signals so diverted automatically activate informational equipment, e.g., a tone generator or a recorded message player, whereby information is returned to the sending party, between successive ringing signals, to advise the sending party that the call is not yet completed and that the receiving party would prefer that the call not be completed. This operation is adapted to continue for a plurality of ringing signals, the number of which may be pre-selected; and if the sending party, notwithstanding the information thus received, believes that the call is sufficiently important to warrant completion, he can, by persisting in his effort to place the call, cause the control equipment to be over-ridden in such manner that the ringing signals are finally permitted to reach the receiving telephone.

The type of information supplied to the sending party can vary, taking the form of a tone, group of tones, or a pre-recorded spoken message. In this respect, moreover, it is recognized that systems have been suggested heretofore wherein recorders and/or playback units may be attached to telephone equipment to automatically supply information to a calling party; but the equipment of the present invention is specifically different from these prior pre-recorded message systems in that the receiving telephone in such prior systems rings before the message is placed on the line, an operation which would effectively frustrate the objects sought by the instant invention. Indeed, such prior pre-recorded systems are habitually used and placed in operation for receiving parties who are away from the telephone for one reason or another, whereby the call would not be completed under any circumstances; and the purpose of the present equipment is, of course, different in that the apparatus of the present invention is adapted to be used under situations where it is normally possible to effect completion of a call after the temporary delay priod imposed by the apparatus.

The foregoing objects, advantages, construction and operation of the present invention will become more readily apparent from the following description and accompanying drawings, in which.

Figure 1:
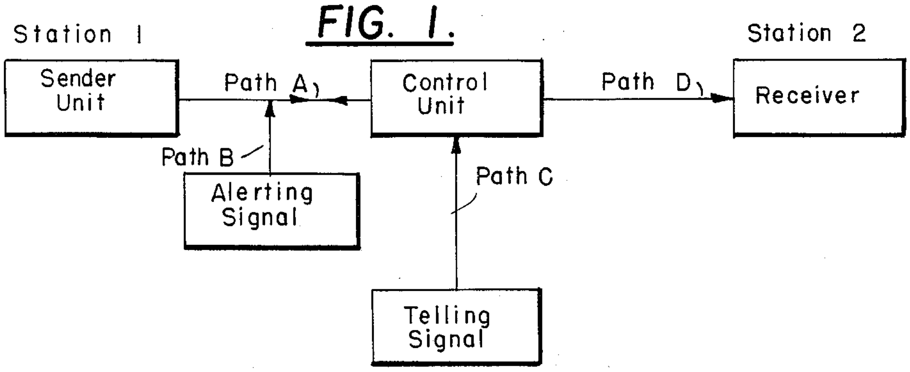
FIGURE 1 is a general block diagram of a communication system, more particularly, a telephone system, employing the control equipment of the present invention.

Referring now to the block diagram of FIGURE 1, it will first be seen that a communication system constructed in accordance with the present invention may comprise a "sender unit" located at a station I; with this portion of the system comprising, for example, a telephone under the control of a calling party. In this respect, of course, it will be appreciated that such a calling telephone is similarly adapted to be used as a receiving telephone; and the various structures and operations to be described hereinafter are adapted for use in either direction of transmission, so long as appropriate equipment is utilized in conjunction with the particular station which is to act as a receiving station. For purposes of the present description, the receiving station has been designated "receiver" at a station II. The sending and receiving stations are interconnected by paths A and D; and the overall apparatus is further associated with an alerting signal source arranged to be selectively coupled to said paths A and D via path a path B. In the absence of the apparatus which characterizes the present invention, an effort by station I to contact or complete a call to station II would normally couple an alerting or ringing signal via path B to paths A and D, thereby causing a telephone, for example, at station II to ring.

The completion of such a ringing path to the receiver at station II, every time that station I seeks to place a call to station II is, for reasons already given, sometimes undesirable. Accordingly, in the present invention a control unit is disposed, as illustrated in FIGURE 1, between paths A and D; said control unit comprising in essence a switching and counting circuit responsive to attempted couplings of an alerting signal via path A to path D. When the control unit is placed into operation by a person at station II (it being understood in this respect that the control unit would normally be located adjacent to the "receiver" at station II), the unit operates to interrupt transmission of signals from path A to path D for a predetermined period of time. The interruption period thus effected is sufficiently long to permit a calling party at station I to be advised that it is preferable not to complete the call, thereby giving the calling party the option of terminating his call before a receiving party at station II is disturbed. To this effect, the occurrence of a first alerting signal on path B, in response to an initial effort by a calling party to complete a call, activates informational equipment operative to transmit a telling signal via path C and the control unit, back along path A to station I. Such transmission of informational or "telling" signals occurs between successive alerting signals; and the telling signal is repeated during these intermediate times for a plurality of operations corresponding, for example, to three or four ringing signals. If, notwithstanding the information thus supplied, the calling party at station I nevertheless persists, the control unit will detect this persistence by an appropriate count of the ringing signals, and will thereafter operate to disconnect the telling signal from path C and to connect the alerting signal from path B via path A to path D, thereby causing the telephone at station II to finally ring. By this sequence of operation, therefore, possible disturbance of a party at station II is prevented for a finite period of time sufficient to permit a calling party to terminate his call; but persistence on the part of the calling party will nevertheless result in a completion of the call, thereby permitting important messages to be completed at the option of the calling or sending party.

Figure 2:
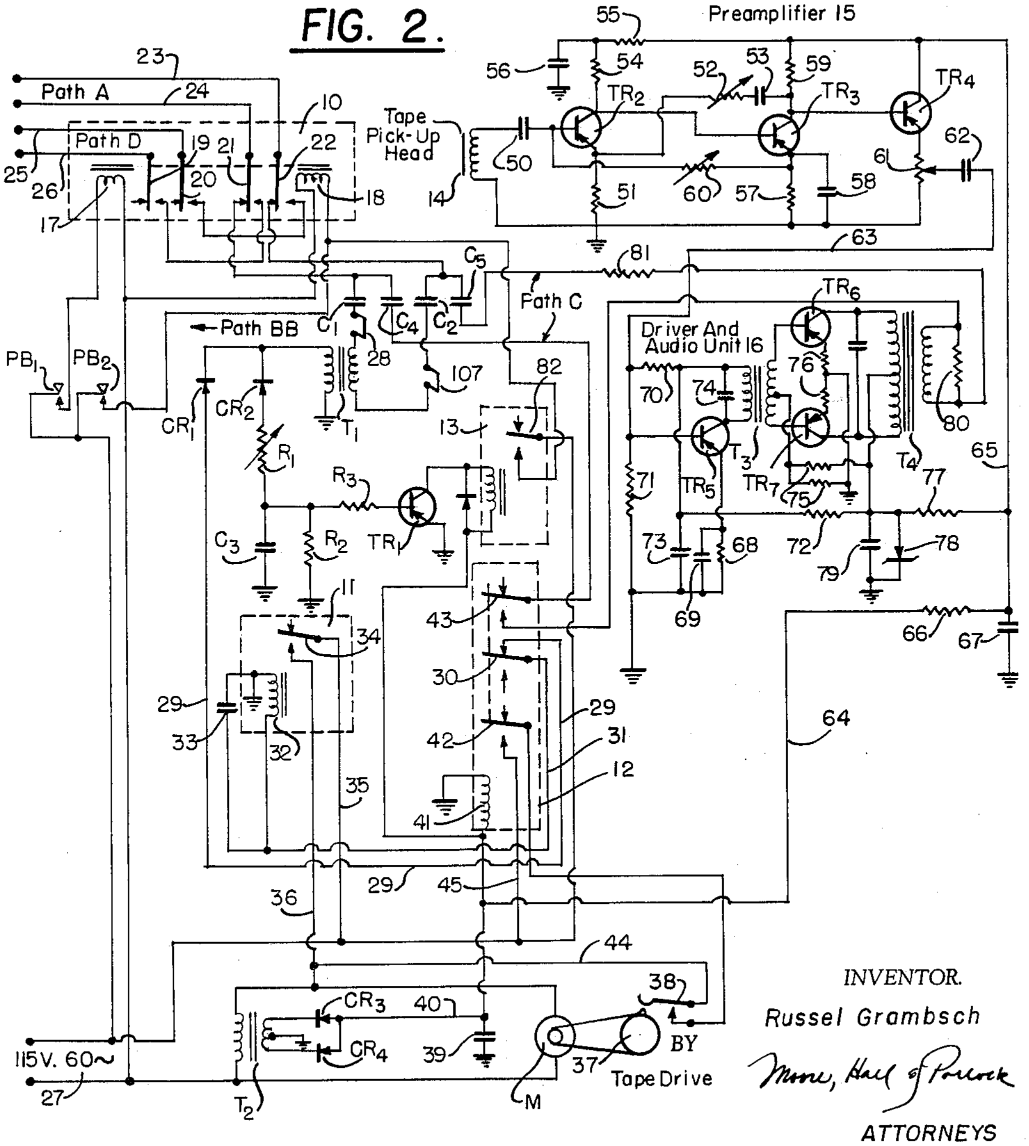
FIGURE 2 is a schematic diagram of a control apparatus constructed in accordance with one embodiment of the present invention.

One preferred control system operating in accordance with the generalized arrangement of FIGURE 1 is shown in FIGURE 2. For purposes of comparison, the various paths A, C and D, described previously in reference to FIGURE 1, have been shown in FIGURE 2; and therefore the actual structure and operation of FIGURE 2 should be considered in conjunction with the block diagram of FIGURE 1. The system itself comprises a plurality of relays 10, 11, 12 and 13 adapted to effect the various switching operations, and other control operations, described previously; a pair of push buttons $PB_1$ and $PB_2$ adapted to be manipulated by a party at the receiving station II to render the equipment operative or inoperative, as will be described; and appropriate informational equipment, which, in the particular arrangement of FIGURE 2, may take the form of a tape player comprising a pick-up head 14 disposed adjacent a mesage tape driven by an appropriate source, such as motor M, and further associated with a pre-amplifier unit 15 and with a driver and audio unit 16 operative to transmit signals via path C to path A, all in the manner described.

Relay 10 is of the so-called latching type, comprising a pair of coils 17 and 18 and switch blades 19 through 22, inclusive, each associated with pairs of fixed contacts, all as illustrated. Relay 10 may take the form, for example, of relay type KB17AG presently marketed by Potter and Brumfield; and it is characterized by an operation wherein momentary energization of one coil 17 or 18 will cause the various switching blades 19 through 22 to move to a first position and latch in said first position until they are caused to be moved into a second or opposite latching position by momentary energization of the other coil 18 or 17.

Telephone lines 23 and 24 comprise path A described previously in reference to FIGURE 1; and they are coupled as illustrated to switch blades 21 and 22 of relay 10. Additional telephone lines 25 and 26 comprise path D also discussed previously; and are coupled to switch blades 19 and 20. The circuit between paths A and D may therefore be completed or interrupted by selective energization of one or the other of relay coils 17 and 18.

Considering now the operation of the system illustrated, let us initially assume that a party at receiving station II desires to place the overall equipment in operation, thereby to temporarily prevent completion of calls and to effect the relaying of an appropriate informational signal during said period of interruption, all for the purposes described. This placing of the equipment into such operation is accomplished by the party at station II depressing push, button $PB_1$, thereby completing a circuit from a 115 volt, 60 cycle source 27 to coil 17 of relay 10. This initial energization of coil 17 causes the various switch blades 19 through 22 to move to their left-hand position; and it will be appreciated that the actual position of the switch blades thus illustrated in FIGURE 2 corresponds to that which would be effected by depression of push button $PB_1$. It will be further appreciated that push button $PB_1$ may thereafter be released; and the latching operation of relay 10 previously described will cause the positions of switch blades 19 through 22 to remain as illustrated. For these positions, moreover, it should be noted that both of lines 25 and 26, comprising path D, are connected to switch blades 19 and 20 which are in an open circuit position, wherefore any signals on path A from either the sender or alternating signal sources cannot be transmitted to path D.

Let us next assume that, with the equipment in this condition of operation, station I, comprising a calling party, seeks to complete a call to station II. The calling party would, in normal course, dial station II and thereby complete the circuit from an appropriate ringing source over path B and connecting to path A at the time of each individual ring. The ringing current thus imposed on lines 23 and 24 is coupled via switch blades 21 and 22 to capacitors $C_1$ and $C_2$ and thence to the primary winding of a transformer $T_1$. The path between capacitor $C_1$ and said primary winding, and between said primary winding and capacitor $C_2$, further includes pairs of terminals interconnected by shorting bars 28 and 107; and said shorting bars 28 and 107 would normally be disposed as illustrated when the overall control apparatus of FIGURE 2 is associated with a receiver on a private line. In many forms of party line equipment, however, coded or otherwise characteristic ringing signals are employed to alert one of several parties that a call is in process of completion; and in such party line systems, shorting bar 28 can be removed and replaced by an appropriate filter consisting of a tuned circuit responsive to the particular ringing signal which characterizes that particular party line. In this respect, moreover, it will be appreciated that this tuned operation, and the selection of a particular ringing signal for control purposes, could also be accomplished by appropriately selecting the parameter value of $C_1$ so that it resonates with the pre-selected values of the inductive components presented by transformer $T_1$, to pass only particular ringing signals while excluding others. Also shorting bar 107 could be removed and that end of $T_1$ connected to earth ground where a party line rings between one line of path A and ground.

A first such ringing signal thus transmitted via capacitors $C_1$ and $C_2$ to transformer $T_1$ causes a voltage to appear at the secondary of $T_1$ which is stepped down to about one-half of the voltage applied to the primary thereof at about twice the current. The signal thus developed across the secondary of transformer $T_1$, is in effect an alerting signal of the type previously described; and applied on path B at the telephone exchange. The secondary winding connections of $T_1$ thus are called path BB. A portion of the current supplied by the secondary of transformer $T_1$ is coupled to a diode $CR_1$ where it is rectified; and this rectified voltage is then fed via line 29, and thence via a normally closed contact 30 in relay 12 to line 31 and thence to the coil 32 in relay 11. A filter capacitor 33 is shunted across relay coil 32 with the time constant of the resulting arrangement being relatively short so that switch blade 34 in relay 11 moves into a closed position before the first ringing signal is completed.

It will be appreciated that the result of the foregoing operation is to close switch blade 34 in relay 11 when the first ringing signal appears on path A; and, as a practical matter, switch blade 34 would move back to its normally open position as soon as the first ringing signal is completed. During its period of closure, however, i.e., during the time that the first ringing signal is in progress, the closure of switch blade 34 completes a circuit from the top line of voltage source 27 via line 35, switch blade 34 and line 36 to the top of the primary winding in a transformer $T_2$, and thence back to the bottom line of source 27. Voltage is thus impressed from source 27 onto transformer $T_2$.

The primary winding of said transformer $T_2$ is, as illustrated, connected across the motor M, comprising the tape drive mechanism in the tape player whereby voltage from source 27, when applied to $T_2$, causes said motor to commence rotation. Motor M, in addition to driving the tape or other record associated wih pick up head 14, is coupled to a cam 37 which selectively controls the positioning of a spring blade 38; and in the particular position shown in FIGURE 2 cam 37 holds said spring blade 38 in an open contact position. Initial rotation of motor M, however, due to initial closure of switch blade 34 and initial energization of transformer $T_2$, all during the progress of a first ringing signal, closes spring blade 38.

At this same time, the initial energization of transformer $T_2$ causes a voltage to be developed across the secondary winding thereof; and this voltage is rectified by a full wave rectifier comprising diodes $CR_3$ and $CR_4$, and filtered by capacitor 39, to produce a substantial D.C. voltage of minus 22 volts on line 40. This D.C. voltage on line 40 is coupled as illustrated to the coil 41 in relay 12, thereby causing the various switch blades 30, 42 and 43 thereof to switch from the positions illustrated in FIGURE 2 to an opposite position. This switching of switch blade 42 is effected during the first ring, and cooperates with the closure of spring blade 38 during said first ring in the manner already described, to complete a circuit from the bottom of source 27 through the primary winding of transformer $T_2$ and thence through line 44, spring blade 38, relay switch blade 42, and line 45 to the upper side of source 27. As a result, the initial closure of spring blade 38 and the initial energization of relay coil 41 completes a holding cricuit through the primary of transformer $T_2$, maintaining the secondary of transformer $T_2$ in an energized state and thereby maintaining the coil 41 of relay 12 in an energized state. Thus, even though relay 11 should become de-energized upon completion of the first ring, relay 12 remains energized. Moreover, transformer $T_2$ remains energized whereby the tape drive motor M continues to rotate. This maintained energization of relay 12, and the resultant opening of switch blade 30 therein, further operates to open the energizing circuit to relay coil 32 in relay 11, whereby subsequent ringing signals have no effect on the operation of relay 11. With relay coil 32 out of the circuit, moreover, more current is available for charging capacitor $C_3$, to be described.

To summarize this initial portion of the operation, therefore, it will be appreciated that a first ringing signal operates to commence rotation of the tape drive motor M, further operates to energize relay 12, operates to maintain that energization through closure of the holding circuit which includes switch blade 42 thereof, and additionally operates, through switch blade 30 in relay 12, to effectively remove relay 11 from the circuit. The third set of contacts in relay 12, i.e., employing switch blade 43, closes a circuit between the driver and audio output unit 16 and path C, thereby permitting signals detected by tape pick up head 14 to thence be coupled to path C, whereby an informational signal is transmitted via capacitors $C_4$ and $C_5$ back to switch blades 21 and 22 in relay 10 and thence to path A.

The arrangement of capacitors $C_1$, $C_2$, $C_4$ and $C_5$ should be particularly noted. In the normal telephone system, ringing signals are applied to the receiving telephone until one picks up the receiver; and this picking up of the receiver completes a D.C. path at the receiving phone serving to terminate the ringing signal. A similar termination of the ringing signal would be effected anytime that a D.C. path is completed across path A; and such a D.C. path would be provided, for example, if one were to merely couple a conventional recorded message player to path A, since such conventional signal sources include output transformers which would present D.C. paths of the types mentioned. The driver and audio output unit 16 includes, for example, an output transformer $T_4$, the secondary of which would, except for the arrangement of capacitors $C_1$, $C_2$, $C_4$ and $C_5$, act to prevent such ringing signals as soon as switch blade 43 couples the audio output unit 16 to path C. This undesirable operation is prevented by the capacitor arrangement shown, employing capacitors $C_4$ and $C_5$; and actually permits informational signals to be coupled to path C while at the same time preventing the establishment of a D.C. path across path A. A plurality of ringing signals may thus occur in sequence on path A even though the first such ringing signal operates, in the manner described, to couple the tape player to said path A.

The signal source comprises tape pick-up head 14, drive motor M and the pre-amplifier and audio output units 15 and 16 are preferably associated with a closed loop tape having a prerecorded message thereon which can be repeated in a relatively short time, i.e., between successive occurrences of ringing signals. A typical message might be, for example, "Sleeping, call back after 10:30 a.m."; but any appropriate message capable of conveying any desired information can be placed on the tape. The tape drive is furthermore so arranged that the tape loop is caused to traverse its entire length, i.e., to make on loop, between each successive ringing signal. The cam 37 mentioned previously is moreover appropriately coupled or geared to tape drive motor M so that cam 37 completes a single rotation thereof only after a predetermined number of repetitions of the message. For example, the equipment may be so set up that once motor M is energized, the recorded message will be repeated three times before cam 37 again contacts switch blade 38 to open its circuit; and accordingly a predetermined number of message repetitions will be effected respectively after a like predetermined plurality of ringing signals, whereafter switch blade 38 opens to terminate this phase of the control operation, all in the manner to be described hereinafter.

Closure of switch blade 43, due to energization of relay 13, completes a circuit operative to impress a prerecorded message on path C. It will be appreciated, of course, that various forms of recorded message playback equipment can be employed to couple the message to path C, and that these playback equipments may be associated with various forms of amplifier arrangements. One particular amplifier arrangement has been depicted in FIGURE 2, comprising pre-amplifier 15, and audio output unit 16; but variations may be readily made therein.

In the particular unit shown, the pre-amplifier 15 comprises transistors $TR_2$, $TR_3$ and $TR_4$. Signals detected by pick-up head 14 are coupled via capacitor 50 to the base of transistor $TR_2$. The emitter of said transistor is coupled to a resistor 51, which cooperates with resistor 52 and with a capacitor 53 to form a frequency selective negative feedback network operated to compensate for the recording characteristic of the tape. Signals amplified by transistor $TR_2$ are developed across a load resistor 54 associated with a decoupling network comprising resistor 55 and capacitor 56; and said signals are direct coupled to the base of transistor $TR_3$, comprising a second stage in the pre-amplifier. Because of this direct coupling, the emitter of $TR_3$ is biased negatively by resistor 57, bypassed by capacitor 58. The output from transistor $TR_3$ is again developed across a load resistor 59, and is direct coupled to the base of transistor $TR_4$ comprising the third pre-amplifier stage. This circuit is stabilized by the D.C. current feedback through an adjustable resistor 60. In practice, transistors $TR_2$ and $TR_3$ may comprise types 2N508, where as transistors $TR_4$ may comprise a type 2N1414; and when these particular types of transistors are employed, the resistor 60 should be adjusted to produce substantially minus 2 volts on the collector of transistor $TR_2$.

As mentioned, the output from transistor $TR_3$ is direct coupled to transistor $TR_4$; and the output from transistor $TR_4$ is taken across a resistor 61 in an emitter follower circuit, being well stabilized by this configuration. Signals developed across emiter resistor 61 are picked off and coupled via capcitor 62 to line 63 comprising the input to driver and audio output unit 16. The various transistors $TR_2$, $TR_3$ and $TR_4$ (and indeed the other transistors to be described hereinafter) are energized from line 40 (comprising the rectified output of transformer $T_2$) via lines 64 and 65; and the appropriate potential levels are achieved by use of a resistor 66 in line 64, acting as a filter and dropping resistor in the power supply, and cooperating with a capacitor 67 acting as a filter and by-pass capacitor.

The driver and audio output unit 16 comprises transistors $TR_5$ $TR_6$ and $TR_7$. Resistor 68 and capacitor 69 form part of a bias circuit for transistor $TR_5$ and are used to increase the stability of the system. Bias of an appropriate level is applied to the base of transistor $TR_5$ from a voltage divider comprising resistors 70 and 71. The system further includes a decoupling circuit comprising resistor 72 and capacitor 73. The collector of transistor $TR_5$ is coupled to the primary winding of a driver transformer $T_3$ shunted by a high frequency bypass capacitor 74. Signals coupled via transformer $T_3$ are then applied to transistors $TR_6$ and $TR_7$ which are connected to form a class B output stage. A voltage divider consisting of resistors 75 provides a slight forward bias to transistors $TR_6$ and $TR_7$, thereby to prevent crossover distortion. The emitter circuits of transistors $TR_6$ and $TR_7$ are further stabilized against thermal run-away by resistors 76; and signals produced by transistors $TR_6$ and $TR_7$ are developed across the primary winding of output transformer $T_4$, connected in a center tapped arrangement as illustrated. Energization for this portion of the system is taken from line 65 across a dropping resistor 77; with the voltage on the center tap of the transformer $T_4$ primary, at the junction of resistors 72 and 77, being stabilized by a Zener diode 78 as the current varies because of the class B operation. Capacitor 79 is provided to by-pass noise voltages across Zener diode 78.

The output signal from driver and audio output unit 16 is developed across the secondary of output transformer $T_4$ and is thence coupled through a pad comprising resistors 80 and 81, as well as via the now closed switch blade 43, to path C, and thence via capacitors $C_4$ and $C_5$ to line path A, all as described previously. This coupling of informational signals to line path A is achieved only after switch blade 43 moves to its closed position in response to occurrence of a first ringing signal. It will further be noted that the disposition of switch blade 43, as indicated, prevents any ringing voltage from being applied to the output transistors $TR_6$ and $TR_7$ before those transistors have their D.C. energization voltage applied thereto. In this respect, it should be further noted that, by reason of the arrangement shown, and although it is not necessary to the working of the equipment, the ringing voltage appearing on path A will feed back through the output transformer $T_4$ to the driver and audio output unit 16 at the end of the first ring, and also during the second, third and subsequent rings, at which times the switch blade 43 is in its closed position.

The entire preceding description relates to the operation of the control equipment in response to a first ring, to prevent that ringing signal from being coupled to the receiving phone, and to also provide an informational message on line A during a time between the first and second rings. The first ringing signal, in addition to performing the conditions already described, is also coupled via path BB through a diode $CR_2$ and thence through a variable resistor $R_1$ to a capacitor $C_3$. This portion of the circuit, and the portion to be described hereinafter, acts in effect as a counter, operative to detect the number of ringing signals which occur, and further operative to effect an alteration in the control operation after a predetermined plurality of ringing signals have occurred. The counting operation, in the particular arrangement shown in FIGURE 2, is achieved in effect by charging capacitor $C_3$ to successively higher voltages in response to the occurrence of successive ringing signals; but such a counting operation can, it will be appreciated, be achieved by other forms of counter devices known in the art, e.g., saturable reactors or appropriate storage registers.

In the arrangement actually shown, the rectified current flowing from $CR_2$ produces a charge on capacitor $C_3$ during each ringing signal, the magnitude of which charge depends upon the adjustment of resistor $R_1$. The charge time is so selected in one typical embodiment of the invention that each ringing signal effects about minus 1.5 volts on $C_3$. At times intermediate successive ringing signals, capacitor $C_3$ tends to discharge somewhat as a result of its own leakage, as well as through resistors $R_2$ and $R_3$, and the base circuit of a control transistor $TR_1$; but the parameters of these discharge paths are so selected in relationship to the charge path afforded through resistor $R_1$, that the discharge time constant on capacitor $C_3$ is much longer than its charge time constant.

Figure 3A:
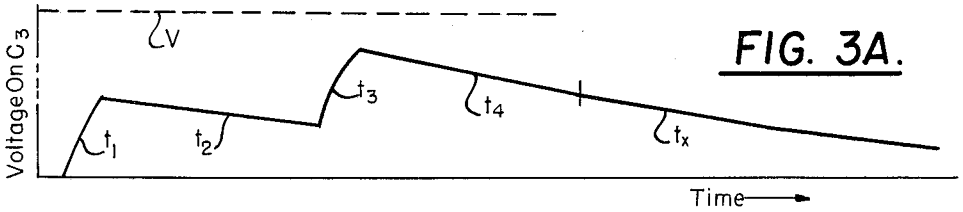
FIGURES 3A and 3B are wave forms illustrating certain operating features of the systems shown in FIGURES 2 and 4.
Figure 3B:
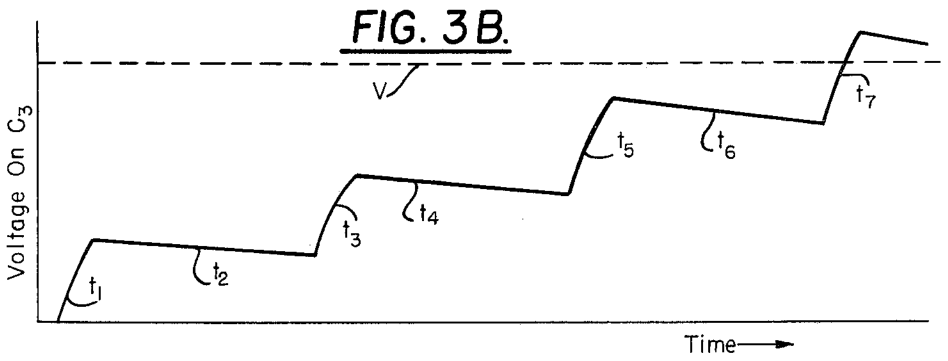

The actual sequence of charge and discharge is best shown in FIGURES 3A and 3B. Thus, during an initial ringing signal, occurring during a time $t_1$, the capacitor $C_3$ will be charged as indicated in FIGURES 3A and 3B; and upon termination of this first ringing signal, the voltage on capacitor $C_3$ will discharge in the manner shown at $t_2$ in each of the figures. Occurence of a second ringing signal will charge capcitor $C_3$, during a time $t_3$ to a still higher voltage, whereafter the capacitor will again discharge during time $t_4$. During times $t_2$ and $t_4$, after the first and second rings, messages will have been placed on path A, indicating that the party being called would prefer not to have the call completed. If, therefore, some time during $t_4$ (see FIGURE 3A) the calling party decided to heed the message and to terminate the call, this would in turn terminate the ringing signals on path A. Capacitor $C_3$ would, therefore, during a time $t_x$ subsequent to time $t_4$ discharge completely; and the overall control apparatus would have in effect served its purpose. The ringing signals on path A will, as mentioned, be terminated, thereby assuring that the party at station II will not have been distrubed.

Even with such termination of the call, it should be noted that, during the time $t_x$, power is still applied to motor M, and the tape or other recorder unit still continues to operate through the holding action of relay 12; but this has no effect on either the receiving or sending station, since both are disconnected. After completing the prescribed number of cycles of the transmitted message, e.g., three repetitions of the message, cam 37 again reaches a point where it engages spring blade 38 to open the circuit associated therewith; and this operates to remove power from the primary of transformer $T_2$ through closed contact 42 of relay 12, thereby in turn de-energizing coil 41 of relay 12 and causing the contacts of said relay 12 to automatically switch back to the positions actually shown in FIGURE 2. This switching of relay 12 in turn removes the recorder from path A, de-energize motor M, and recompletes the circuit to relay 11 whereby the entire unit is automatically readied for a completely new control cycle upon commencement of a new telephone call; all without having at any time disturbed the party at station II.

In the alternative, let us assume that the calling party at station I believes that his message is sufficiently important to warrant disturbing the party at station II. The calling party would in these circumstances merely ignore the informational message being received, and permit the ringing signals to repeat. A third such ringing signal would, as indicated in FIGURE 3B charge capacitor $C_3$ to a still higher voltage during a time $t_5$ whereafter capacitor $C_3$ would discharge during time $t_6$ (corresponding to the transmission of the third message); and a fourth ringing signal, occurring during a time $t_7$ would raise the voltage on capacitor $C_3$ still higher. When the voltage on capacitor $C_3$ reaches a sufficiently high voltage, indicated in FIGURE 3B as V, the current through resistor $R_3$ and the base current of transistor $TR_1$ will become sufficiently large to cause switching transistor $TR_1$; and transistor $TR_1$ thereupon conducts heavily enough to close relay 13. The actual number of ringing signals necessary to accomplish this operation will depend upon the desires of the user of the equipment, and can be adjusted by resistor $R_1$; and in the particular example shown in FIGURE 3B, an operation has been disclosed wherein the voltage V is reached during the fourth ring.

The switching of transistor $TR_1$ and energization of relay 13, closes contact 82 in relay 13, thereby completing a circuit from the upper side of source 27 through said contact 82, and thence through coil 18 of latching relay 10 back to the bottom side of source 27. This energization of coil 18 switches all of switch blades 19 through 22 inclusive over to their right-hand positions thereby completing a circuit directly from path A to path D through the contacts of relay 10. Still further ringing signals appearing on path A will therefore be coupled to path D so as to ring the phone at station II. This in turn alerts the party at station II that an important call is being attempted, whereafter the call may be taken in normal fashion. Upon completion of such a call, the party at station II could, by depressing push button $PB_1$ re-energize coil 17 in relay 10, thereby placing the equipment back into its initial condition so that further control operations of the type described can be effected.

If, during a period of operation, the equipment has performed its desired function in preventing the completion of unimportant calls, the party at station II may, by depressing push button $PB_2$, apply a voltage directly from source 27 to coil 18 in relay 10, thereby switching the switch blades of said relay 10 back into a position interconnecting paths A and D. Thus, depression of push button $PB_2$ in effect takes the entire control system out of the circuit and permits the phone lines to be interconnected in normal manner.

Figure 4:
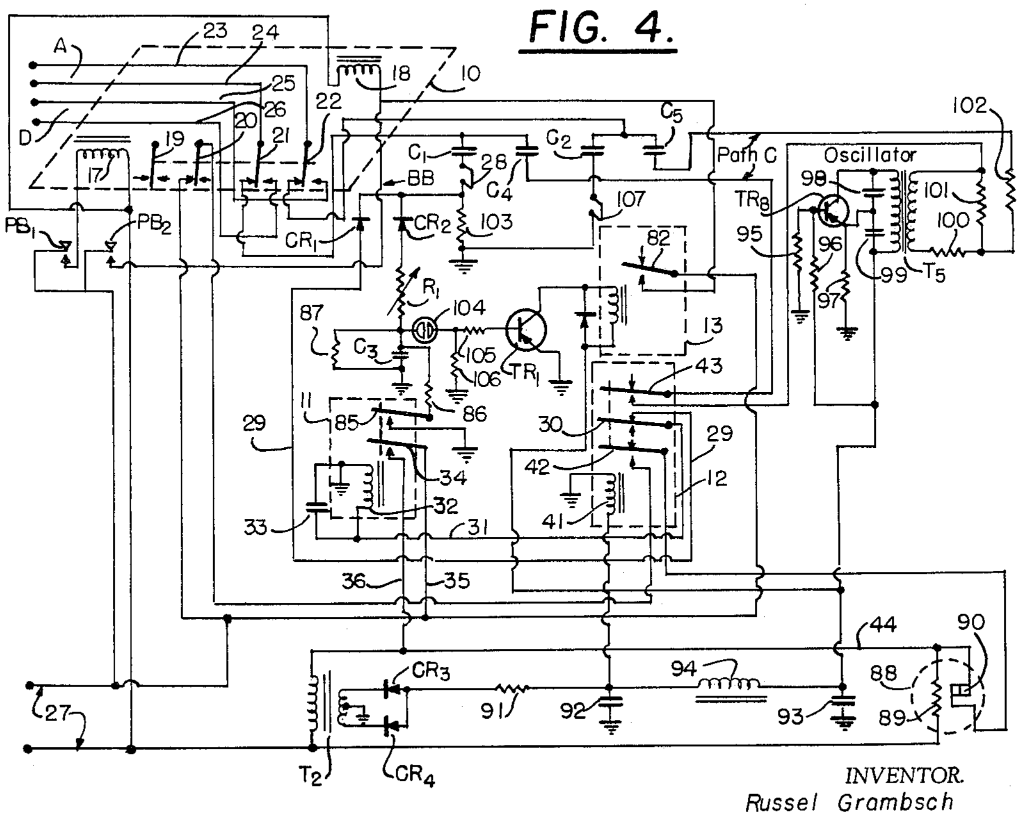
FIGURE 4 is a schematic diagram of a modified, somewhat simplified, embodiment of the present invention.

An alternative arrangement of somewhat simplified form is shown in FIGURE 4. This arrangement is generally similar to that previously described in reference to FIGURE 2 and contains a number of the same components already discussed. In order to facilitate comparison of the components in FIGURES 2 and 4, therefore, like numerals have been employed in FIGURE 4 to depict parts already described in reference to FIGURE 2. The arrangement of FIGURE 4 differs from that of FIGURE 2 essentially in the elimination of the tape player and associated mechanism; and to this effect, the arrangement of FIGURE 4 employs a transistor oscillator adapted to produce a characteristic tone indicating to a calling party that it is preferred not to have the call completed. In view of the elimination of the playpack mechanism of FIGURE 2 and the attendant elimination of its driving motor, the arrangement of FIGURE 4 further distinguishes from that of FIGURE 2 in the use of a delay relay 88 operative to perform a function similar to that of cam 37 and spring blade 38 previously described. Since the general operation and arrangement of FIGURE 4 is closely related to that of FIGURE 2, this operation will not be repeated in its entirety. However, the simplifications in structure effected in FIGURE 4 require some modification of the electrical interconnections in the circuit; and these changes are accordingly described hereinafter.

As in the arrangement of FIGURE 2, the modified arrangement of FIGURE 4 includes relays 10 through 13 inclusive, push button $PB_1$ and push button $PB_2$, the capacitor coupling arrangement $C_1$, $C_2$, $C_4$ and $C_5$, the rectifiers $CR_1$ and $CR_2$ associated with path BB, the switching transistor $TR_1$ associated with relay 13, and the capacitor $C_3$ for selectively activating relay 13 through $TR_1$ after a preselected number of ringing signals have occurred. The system is placed in operation by initial depression of push button $PB_1$ which operates to latch the various switch blades 19 through 22 inclusive of relay 10 into the position shown in FIGURE 4. As in the arrangement of FIGURE 2, a first ringing signal thereafter effects a current flow through $CR_1$ and thence via the normally closed contact 30 of relay 12 to the coil 32 of relay 11 thereby to complete an energization circuit to transformer $T_2$. In the arrangement of FIGURE 4, relay 11 is supplied with an additional switch blade 85 connected to the timing capacitor $C_3$, and having a fixed contact connected to chassis ground; and the initial closure of relay 11 accordingly operates to perform not only those functions which have been discussed in reference to FIGURE 2, but also operates to discharge capacitor $C_3$ completely via a relatively low resistance 86. In this respect, it might be further noted that timing capacitor $C_3$ is shunted by a relatively large resistor 87, wherefore it would tend to slowly discharge therethrough even without the arrangement of switch blade 85; but if two calls were to come into the system in closely spaced relationship, $C_3$ might not be fully discharged. The arrangement of switch blade 85 assures such complete discharge, as soon as the first ring of a new call is received. The discharge resistor 86 serves to limit the peak discharge current so as to prevent the points of the relay from burning while still permitting a rapid discharge.

The initial energization of transformer $T_2$ energizes coil 41 of relay 12 in a manner similar to that of FIGURE 2. Relay 12 again includes three sets of contacts; one of which, 42, is provided to complete a holding circuit, the second of which, 30, is provided to remove relay 11 from the circuit upon completion of the first ring, and the third of which, 43, is provided to connect an informational source to line path A. The holding circuit function accomplished by switch blade 42 is achieved in a somewhat different manner, in the arrangement of FIGURE 4, from that previously described with reference to FIGURE 2. In this respect, it will be recalled, in FIGURE 2, that the switch blade 42 cooperated with a motor driven cam 37 and spring blade 38; and the function of said cam and spring blade is, in the arrangement of FIGURE 4, accomplished by a delay relay 88 comprising a heater element 89 and a pair of normally closed bimetallic contacts 90. A typical delay relay of the type shown at 88 comprises Amperite relay 115C45T.

The relay 10 is, moreover, interconnected to the other components in a manner slightly different from that previously described in reference to FIGURE 2, in that the switch blade 20 thereof is also used to form a portion of the holding circuit. Upon initial energization of transformer $T_2$ and the subsequent energization of relay coil 41 in relay 12, a holding circuit is now completed for transformer $T_2$ and relay 12 from the top side of source 27 through switch blade 20 of relay 10, then through the holding contact 42 of relay 12, and thence via the normally closed contacts 90 of delay relay 88 to line 44, through the primary winding of transformer $T_2$, to the bottom side of source 27. This holding circuit assures that, upon completion of a first ringing signal, transformer $T_2$ and relay 12 will remain energized.

The secondary voltage of transformer $T_2$, as in the arrangement of FIGURE 2, is rectified by a full wave rectifier; and this output is limited by resistor 91 and is filtered by capacitors 92 and 93 in association with inductance 94, to supply power to the various transistors, etc.

In the arrangement of FIGURE 4, the informational signal, provided between successive ringing signals, is supplied by a tone generator or oscillator utilizing a transistor $TR_8$, the base voltage of which is determined by a voltage divider circuit 95–96. The emitter of transistor $TR_8$ is returned to chassis ground through resistor 97. For purposes of effecting oscillation, positive feedback is taken at the junction of a pair of capacitors 98–99 and fed to the emitter. The oscillatory output is taken from the transistor collector through an output transformer $T_5$ with the frequency of oscillation of the oscillator thereby being determined essentially by the parameter values of capacitors 98–99 and the inductive component of transformer $T_5$. The secondary of transformer $T_5$ is connected to a T pad comprising resistors 100, 101 and 102, and is then coupled via D.C. isolation capacitors $C_4$ and $C_5$, and through closed switch blade 43 of relay 12, back to switch blades 21 and 22 of relay 10 and then to path A. Upon completion of a first ringing signal, therefore, a characteristic tone will be supplied to the calling party, all for the purposes described.

In the arrangement of FIGURE 4, the transformer $T_1$ of FIGURE 2 has been eliminated; and the ringing voltage, coupled through capacitors $C_1$ and $C_2$, is developed across a resistor 103. Element 103 could also be an inductance, if selective ringing frequencies were used; and $C_1$ and inductance 103 could then be selected so as to get resonance in this circuit. Current is supplied via path BB through the crystal rectifiers $CR_1$ and $CR_2$ for the purposes previously described; and in particular, the current supplied by rectifier $CR_2$ is used to count the number of ringing signals thereby to permit the control equipment to be bypassed after a preselected number of signals has occurred. The elimination of transformer $T_1$ requires that the base current of the switching transistor $TR_1$ be limited somehow to achieve a sufficiently long time constant for the capacitor $C_3$ circuit; and this is achieved by means of a neon bulb 104, e.g., of type NE–2, connected between the timing capacitor $C_3$ and the base of switching transistor $TR_1$. The inclusion of neon bulb 104 assures that no current discharging from capacitor $C_3$ will reach the base of transistor $TR_1$ until the voltage across $C_3$ reaches a level sufficient to ionize neon bulb 104.

As in the case of FIGURE 2, a succession of ringing signals are therefore required to build up the voltage on capacitor $C_3$; and once neon bulb 104 ionizes, it conducts sufficiently heavily to throw $TR_1$ into conduction thereby to energize relay 13. Resistors 105 and 106 are provided to limit the peak base current in $TR_1$, and connect the base to chassis ground. The resistor $R_1$ is provided as in the case of FIGURE 2, to determine the time delay imposed before relay 13 is energized; and in a typical case, the resistor $R_1$ may be so adjusted that neon bulb 104 will not break down until the fourth ringing voltage has been applied to capacitor $C_3$.

When the switch blade 82 of relay 13 closes the coil 18 of relay 10 is energized to interconnect line paths A and D. It will be noted, however, that, at this phase of the operation, switch blade 20 of relay 10 also opens; and this breaks the holding circuit and removes power from $T_2$ thereby readying the entire system for a next call.

The energization of transformer $T_2$, in response to receipt of a first ringing signal, performs not only the functions previously described but also serves to place a voltage across heater 89 to relay 88. This voltage continues to be applied to the heater element throughout the sequence of operations described, event if the attempted call should be terminated after the first, second, or third rings. Upon elapse of an appropriate period of time, e.g., forty-five seconds, the bimetallic contacts 90 open due to the heat generated by heater 89, thereby breaking the holding circuit to relay 41 and transformer $T_2$; and the equipment accordingly reverts to its initial status in preparation for the receipt of a next call. If no completed call is received during the period of operation, the party at receiving station II may place his phone back into normal operation by pushing $PB_2$, all as described previously.

While I have thus described preferred embodiments of the present invention, many variations will be suggested to those skilled in the art, and certain of these variations have already been discussed. Other modifications and variations will, however, become apparent to those skilled in the art; and it must, therefore, be understood that the foregoing description is meant to be illustrative only, and all such variations and modifications as are in accord with the principles of the present invention are meant to fall within the scope of the appended claims.

Having thus described my invention, I claim:

1. In a communication system of the type employing a sending station, a receiving station, and a source of spaced alerting signals for advising the receiving station of an attempted communication contact by said sending station; a control system adjacent said sending station comprising manually operable first switch means disposed in the normal communication path between said sending and receiving stations for manually disconnecting said source of alerting signals from said receiving station at the will of an operator at said receiving station, said control system including means responsive to occurrence of an alerting signal from said source for supplying an informational signal to said sending station advisory that the receiving station would prefer not to be disturbed, counter means in said control system operative to count successively occurring ones of said alerting signals, said control means including means responsive to termination of alerting signals prior to occurrence of a predetermined number of successive such alerting signals for resetting said counter means to a preselected starting condition preparatory to a further alerting signal counting operation, and second switching means coupled to said counter means and responsive to the counting of said predetermined number of successive alerting signals for overriding said manually operable first switch means and completing a circuit for transmitting next successive ones of said alerting signals to said receiving station.

2. In a telephone system employing a pair of telephone sets interconnected to one another by lines, and a source of successive ringing signals adapted to be coupled to said lines for alerting one of said sets to a call from the other of said sets; a control system disposed adjacent the set being called, said control system comprising first switch means adapted to be disposed in said lines, said first switch means being operable to assume either of two different switch positions, means for placing said first switch means in one of said positions thereby to disconnect the normal communication path between said sets, a normally deenergized source of informational signals, said informational signal source being normally disconnected from said lines, second switch means in said control system responsive to a ringing signal placed on said lines by operation of the calling set for energizing said informational signal source, said control means also including third switch means responsive to a ringing signal placed on said lines for connecting said informational signal source to said lines thereby to relay an informational signal back to said calling set along said lines; means for counting the number of ringing signals applied to said lines by continued operation of said calling set, and means responsive to occurrence of a predetermined plurality of said ringing signals for placing said first switch means into the other of its said positions to reconnect the normal communication path between said sets thereby to couple further ringing signals to the set being called.

3. The system of claim 2 wherein said informational signal source includes means operative to repeat said informational signal successively during the time intervals between successive ones of said ringing signals, and means responsive to a predetermined number of repetitions of said informational signal for automatically deenergizing said informational signal source.

4. The system of claim 2 wherein said means for placing said first switch means in one of said positions includes manually operable means coupled to said first switch means for placing said first switch means into either of its said two different switch positions thereby to disconnect and reconnect the normal communication path between said sets at will.

5. A telephone receiver comprising input lines, control means operable to disconnect said receiver from possible incoming ringing signals occurring on said input lines, recorder means operable to repetitively produce a pre-recorded message, said recorder means being normally disconnected from said input lines, means in said control means responsive to at least one of said ringing signals for connecting said recorder means to said input lines to transmit said repetitive pre-recorded message back toward the source of said ringing signals, means for automatically terminating said transmission after a predetermined number of repetitions of said message have occurred, means for counting the number of ringing signals which are intercepted at said control means, and switching means responsive to occurrence of a predetermined plurality of successive such ringing signals for connecting subsequent ringing signals to said receiver, said predetermined plurality of ringing signals being at least equal in number to said predetermined number of message repetitions.

6. In a telephone system of the type employing a sending set, a receiving set, lines therebetween, and a source of ringing signals adapted to be coupled to said lines for alerting the receiving set to a call from said sending set; switching means comprising input relay means having a pair of individually energizable coils operable to switch said input relay means into either of two different switch positions respectively, manually operable control means for selectively energizing one of said coils to switch said input relay means into a first switch position operative to disconnect said ringing signal source from said receiving set, a source of informational signals, further relay means responsive to occurrence of a first ringing signal on said lines for activating said source of informational signals to repetitively supply an informational signal to said sending set, and means responsive to the occurrence of a predetermined number of ringing signals subsequent to said first ringing signal for energizing the other of said coils in said input relay means to switch said input relay means into the other of said switch positions thereby to connect said source of ringing signals to said receiving set.

7. The system of claim 6 including further manually operable control means for selectively energizing the other of said coils at will.

References Cited by the Examiner

UNITED STATES PATENTS

| | | | |
|---|---|---|---|
| 2,715,161 | 8/1955 | Lutz et al. | 179—89 |
| 3,033,941 | 5/1962 | Bell et al. | 179—89 |
| 3,064,085 | 11/1962 | Muramatsu | 179—89 |

ROBERT H. ROSE, *Primary Examiner.*

WALTER L. LYNDE, *Examiner.*

H. BOOHER, *Assistant Examiner.*